United States Patent Office
2,908,563
Patented Oct. 13, 1959

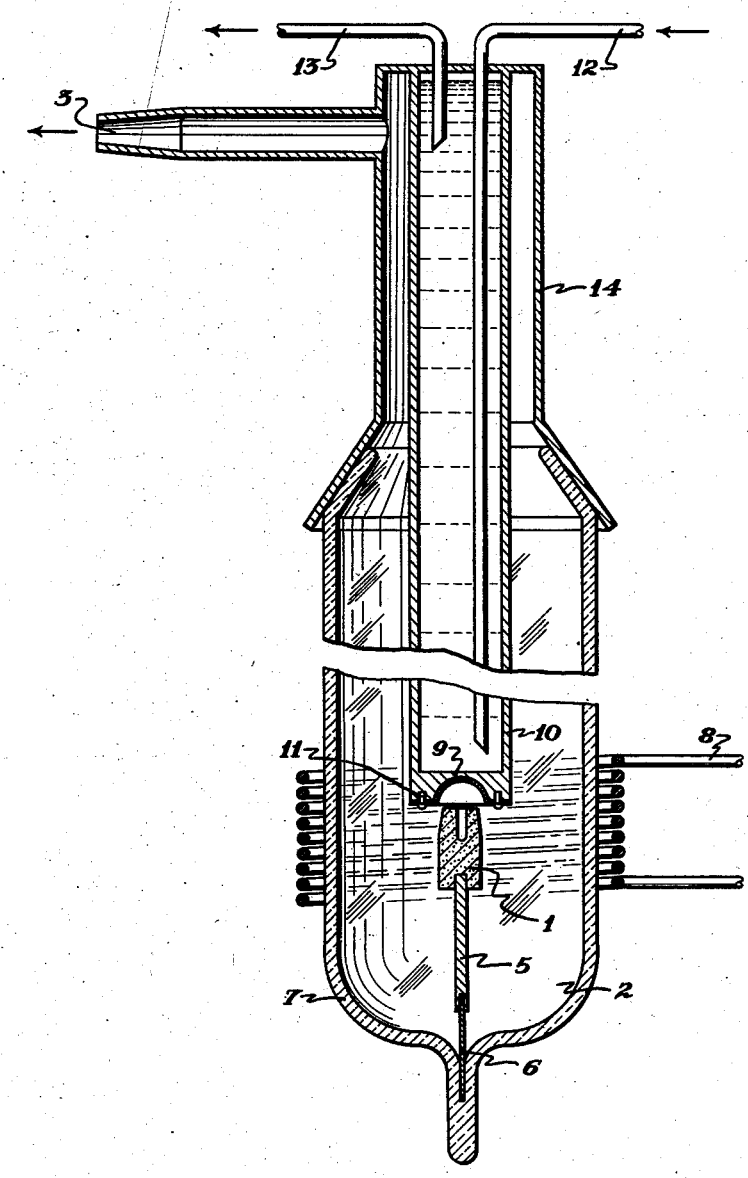

2,908,563

PROCESS FOR PRODUCTION OF PLUTONIUM FROM ITS OXIDES

Sam I. Weissman, Chicago, Ill., Morris L. Perlman, New Orleans, La., and David Lipkin, O'Neals, Calif., assignors to the United States of America as represented by the United States Atomic Energy Commission Application February 19, 1946, Serial No. 648,836

3 Claims. (Cl. 75—84.1)

This invention relates to methods of preparing pure metals and to methods for preparing pure metals from the oxides thereof, and is especially directed to a method of producing carbides of plutonium and other metals from their oxides, and to methods for obtaining pure plutonium from such carbides and such oxides.

Many metals, such as plutonium, are difficult to reduce from their respective oxides directly to the metal stage. It is therefore a common procedure to convert the oxide to a halide and then to reduce the halide with a more electropositive metal. Such systems often have many disadvantages, including (1) high cost, (2) involved and special handling procedures, particularly because of the reactivity of the electropositive element, and (3) contamination of the final metal by the reducing metal. Consequently, it has been desired for some time to provide a method for reducing these metals, e.g., plutonium, directly from the oxide under such conditions that the metal is not contaminated by the reducing agent or the original oxide, and preferably free of other elements which contaminate the original oxide.

It is an object of this invention to provide a method for preparing metal, particularly plutonium, from the oxide without the formation of an intermediate metal halide.

It is a further object to provide a system for preparing substantially pure plutonium from plutonium oxide.

It is a still further object to provide a method and means for purifying plutonium by a simple procedure.

It is another object of the invention to provide a method and means for effecting reduction of a plutonium oxide in a single treatment through a carbide to the metal, meanwhile effecting the purification of said metal.

It is still another object to produce novel carbides of plutonium from an oxide of plutonium.

Other objects of this invention will be apparent from the following specifications including the drawing forming a part thereof, in which the figure is a cross-section of an elevation of an apparatus employing principles of this invention.

These foregoing objects are obtained by the novel system of the invention in which the metal oxide, e.g., plutonium oxide, is reduced with sufficient carbon or other carbonaceous reducing material at an elevated temperature, and in an inert, low pressure atmosphere, preferably a high vacuum, to form a metal carbide. This carbide has utility per se and can be removed from the chamber at this point. One feature of the carbide is thermal instability at relatively specific minimum temperatures. The second step of this unitary process comprises raising the temperature of the reaction zone so that the carbide decomposes to the metal which distills from the reaction mixture and is condensed in an inert zone at a lower temperature, to yield a pure metal product.

The process can be operated at the temperature of decomposition of the plutonium carbide because the metal carbide will be formed from the oxide and will immediately be decomposed to form plutonium metal which distills from reaction mixture. In fact it is possible to use only sufficient carbon to combine with the oxygen to form carbon monoxide, thus yielding metal which will distill from the reaction zone at the low pressure of operation. However, these single step methods have the disadvantage that the carbon monoxide is present with the distilling and condensing metal, and consequently some reversal of reaction takes place.

Therefore, it is preferred to perform the operation in two stages, namely, formation of a plutonium carbide and carbon monoxide by reaction of a plutonium oxide with carbon (or a carbon-generating material) while removing the gaseous carbon monoxide, and then to raise the temperature to decompose the non-volatile plutonium carbide to metal which distills from the reaction zone. Although the method is applicable to several metals, it is still possible to produce individual metals from a mixture thereof by choosing the temperature conditions at which the particularly desired metal carbide is selectively formed, choosing the temperature condition at which the particular carbide is selectively decomposed, and/or by choosing a temperature at which that metal is selectively distilled.

The apparatus for accomplishing these objects defines a zone for reacting the metal oxide with the carbonaceous material to form the thermally unstable carbide, a zone for condensing the metal distilled from the thermally unstable carbide, means for maintaining an inert, low pressure atmosphere in the zones, means for controlling heating of the reaction zone and means for cooling the condensing zone without destroying the inert gas atmosphere. The term "inert" is used herein to indicate the absence of conditions which will cause undesirable reactions with the materials involved in the reaction, but is not intended to exclude the use of gaseous carbonaceous materials which bring about the desired reaction as a source of raw material of the reaction.

For a more detailed description of the process, and features of the novel apparatus, attention is directed to the apparatus of the figure to illustrate the principles of the invention. A crucible 1, preferably of graphite, but conveniently of other inert material such as tantalum, is mounted within a zone 2, adapted to be evacuated through outlet 3, which is connected to a suitable vacuum system not shown. The mounting of the crucible can be through a support 5 of tantalum, which in turn is supported by a tungsten wire 6 held in a capillary in the wall of a surrounding fused silica glass (quartz) container 7. Tungsten is selected for this purpose because it has substantially the same coefficient of expansion as the glass container. The container is advantageously of silica glass because it will not be subject to induced heat by the induction coil 8 surrounding the glass chamber at the elevation of the crucible 1, and because it is refractory and can withstand the high temperatures of operation. Above and very close to the opening of the crucible 1 is suspended inert receiver 9, e.g., a dome or cup shaped reentrant portion of tantalum, which serves as the condensing chamber for the metal eventually distilled from the crucible 1. This dome 9 is held in excellent heat exchange relation with a hollow water-cooled copper or silver tube 10 by rivets 11 of copper or silver. Cold water is fed into intake pipe 12 which discharges inside of rod or tube 10 over the reentrant portion of the dome 9. Warm water is removed from the cooling zone through discharge pipe 13. The heat-conducting (condensing) portion 14 of the apparatus is attached to the heat-insulating (reacting) portion of the apparatus by a tapered friction seal between the metal (female) and ground glass (male) sections. The charge of metal oxide, e.g., plutonium dioxide, for example about 55 milligrams thereof, is placed in the graphite crucible which may vary in size, e.g., having an outside diameter of about three-fourths inch, and an opening of about one-fourth inch in diameter, and one-fourth inch deep. It is preferred to mix the oxide with a substantial excess of graphite powder over the stoichiometrical proportion required to reduce the oxide, e.g., two to three times this amount. However, it is also possible to bleed methane, acetylene, or other gas into the crucible by means of a tube (not shown) to generate carbon or a reducing atmosphere in situ under the conditions of operation, thus replacing or supplementing the graphite powder in the crucible.

The reaction chamber is then brought to a very low pressure by evacuating through outlet 3, meanwhile gradually raising the temperature to over 100° C. A small amount of helium or other inert gas can be bled into the reaction zone to displace any air or other undesirable gases, and then the zone can be thoroughly evacuated again to a pressure of not greater than a few microns, e.g., 3 to 10, of mercury. Water, diphenyl, or other coolant is meanwhile circulated through the jacket in the condensing zone. The temperature is then raised to about 1400 to 1500° C., at which a reduction reaction takes place to form the novel plutonium carbide ($PuC_x$) and carbon monoxide, with substantially complete conversion taking place. The probable formula for the reaction is:

$$PuO_2 + (x+2)C \rightarrow PuC_x + 2CO\uparrow$$

After a few minutes the reaction appears to have been completed and the carbon monoxide is removed. For insuring completion of the reaction, treatment may be for an hour or so. The apparatus may be cooled and the plutonium carbide removed for appropriate use. For example, it can be used in neutronic reactors, for experimental measurements such as neutron cross-sectional measurements, and for admixture with other metal carbides for modifying the properties of those carbides.

Usually, however, the process comprises another step which involves raising the temperature of the crucible to about 1850 to 2100° C., e.g., 1900° C., at which temperature, and under reduced pressure, the plutonium carbide decomposes rapidly to yield carbon and volatile metal. The plutonium distills or sublimes from the crucible and collects by condensation on the surface of the tantalum dome, e.g., about three-fourths inch in diameter and about three-fourths inch deep, in close proximity to the opening of said crucible. The resulting plutonium is obtained in yields up to about 95 to 100% and is spectroscopically pure. This condition appears to result from at least one and often from all of the following features: selective reduction of the oxide to the carbide, selective decomposition of the carbide, and selective distillation of the plutonium.

In decomposition of the plutonium carbide other materials such as tantalum can be present which metal has a low vapor pressure and forms very stable carbides. Consequently it is possible to insure the complete decomposition of the plutonium carbide and freedom from carbon in the final distilled metal.

The temperatures of operation are given by way of example and are not limiting on the scope of the invention. For example, 2100° C. is convenient for operation but higher temperatures can be used advantageously. Furthermore, it is feasible rapidly to raise the temperature to the second range of temperatures so that the two steps in the reduction of the oxide to metal take place substantially simultaneously.

When the mixture of plutonium oxide and graphite is heated in vacuum using the stoichiometrical amount of graphite, the reduction reaction takes place at about 1200 to 1500°, as follows

This is essentially the same reaction if the entire operation is performed at 1900° C. or higher, even with an excess of carbon.

The process of producing the novel plutonium carbide is not limited to the foregoing procedure but the carbide can be formed by reacting powdered plutonium metal with powdered graphite in an inert atmosphere and elevated temperature or by any other procedure for forming metal carbides. Furthermore the carbide produced by any of these procedures may be used as a source of plutonium metal. In fact, in large scale operation there is some advantage in producing the carbide in one stage and producing pure metal therefrom in another stage. For example, uniformity of operation in individual apparatus stages is thus obtainable.

The process is particularly applicable to the treatment of plutonium isotopes, but it is also applicable to other metals, the specific temperature of operation being selected for each. Although plutonium dioxide is specifically mentioned other oxides of plutonium may be used such as $Pu_2O_3$. Other reducing agents having a higher volatilization temperature than the metal to be produced, e.g., silicon, can be used in place of or along with the carbon. Depending on the excess of carbon present and the particular oxide employed, various carbides can be formed such as $PuC$, $PuC_2$, $Pu_2C_3$. In place of the graphite crucible, a tungsten, tantalum, or other crucible in which heat can be induced may be used.

As many widely different embodiments of the present invention may be made without departing from the spirit or scope thereof, it is not to be limited except as defined in the appended claims.

What is claimed is:

1. The process for the recovery of plutonium from plutonium oxide which comprises reacting plutonium oxide with carbon at a temperature of about 1200° C. to 1500° C. at a pressure of about 3 to 10 microns of mercury, removing the resulting carbon oxide, raising the temperature of the plutonium carbide formed to about 1900° C. to 2100° C. while maintaining a pressure of about 3 to 10 microns of mercury whereby plutonium is volatilized from the plutonium carbide, and recovering the plutonium as a condensate.

2. The process of recovering plutonium from plutonium oxide which comprises heating the plutonium oxide with a stoichiometrical amount of carbon for the oxygen present to a temperature of about 1200° C. to 1500° C. under a pressure of about 3 to 10 microns of mercury, and recovering the plutonium as a condensate.

3. The process of recovering plutonium from plutonium carbide which comprises heating the carbide of plutonium to a temperature of about 1900° C. to 2100° C. under a pressure of about 3 to 10 microns of mercury whereby the plutonium carbide is dissociated, and recovering the plutonium metal as a condensate.

References Cited in the file of this patent

UNITED STATES PATENTS

| 866,385 | Von Pirani | Sept. 17, 1907 |
| 1,518,083 | Lohmann | Dec. 2, 1924 |
| 1,776,053 | Voigtlander et al. | Sept. 16, 1930 |

OTHER REFERENCES

Hopkins: "Chapters in the Chemistry of the Less Familiar Elements," vol. II, publ. 1939 by Stipes Publishing Co., Champaign, Ill., chapter 18, Uranium, pages 14, 15.

Seaborg: "The Chemical and Radioactive Properties of the Heavy Elements," Chemical and Engineering News, December 10, 1945, pp. 2190–2193.

Seaborg et al.: "The Chemical Properties of Elements 94 and 93," J.A.C.S., vol. 70 (1948), pp. 1128–1134, submitted March 21, 1942.